(12) United States Patent
Kottilingam et al.

(10) Patent No.: US 6,883,700 B2
(45) Date of Patent: Apr. 26, 2005

(54) TURBINE BLADE CLOSURE SYSTEM

(75) Inventors: Srikanth Chandrudu Kottilingam, Orlando, FL (US); Peter J. Ditzel, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 48 days.

(21) Appl. No.: 10/255,894

(22) Filed: Sep. 26, 2002

(65) Prior Publication Data

US 2004/0060964 A1 Apr. 1, 2004

(51) Int. Cl.[7] .............................................. B23K 31/02
(52) U.S. Cl. .................... 228/119; 228/112.1; 228/113; 228/114
(58) Field of Search ............................. 228/112.1, 113, 228/114, 114.5, 119, 2.1, 114.8; 60/39.44; 416/213 R, 223 R; 29/889–889.3

(56) References Cited

U.S. PATENT DOCUMENTS

| 3,444,611 A | 5/1969 | Bogart |
| 3,495,321 A | 2/1970 | Shaff et al. |
| 3,768,147 A | 10/1973 | Berry et al. |
| 3,982,854 A * | 9/1976 | Berry et al. ............ 416/213 R |
| 4,087,038 A | 5/1978 | Yagi |
| 5,067,234 A | 11/1991 | Fraser |
| 5,111,570 A | 5/1992 | Baumgarten et al. |
| 5,460,317 A | 10/1995 | Thomas et al. |
| 5,469,617 A | 11/1995 | Thomas et al. |
| 6,095,395 A | 8/2000 | Fix, Jr. |
| 6,193,468 B1 | 2/2001 | Beeck et al. |
| 6,230,958 B1 * | 5/2001 | Coletta et al. ........... 228/114.5 |
| 6,370,752 B1 | 4/2002 | Anderson et al. |
| 6,386,419 B2 * | 5/2002 | Coletta et al. ............... 228/2.3 |
| 6,413,041 B1 * | 7/2002 | Sedillo ....................... 415/115 |
| 6,413,650 B1 * | 7/2002 | Dupree et al. .............. 428/579 |
| 6,454,156 B1 * | 9/2002 | Taras et al. ................. 228/165 |
| 6,516,865 B1 * | 2/2003 | Beeck et al. ................ 164/76.1 |
| 6,615,470 B2 * | 9/2003 | Corderman et al. ...... 29/402.13 |
| 2002/0096047 A1 * | 7/2002 | Stoppek ....................... 92/255 |
| 2002/0125297 A1 * | 9/2002 | Stol et al. ................. 228/112.1 |
| 2003/0034379 A1 * | 2/2003 | Jackson et al. ............. 228/119 |
| 2003/0066864 A1 * | 4/2003 | Delano ..................... 228/112.1 |

* cited by examiner

Primary Examiner—L. Edmondson

(57) ABSTRACT

A turbine blade closure system composed of a closure member capable of being friction welded in an aperture in a hollow-cast turbine blade to prevent the escape of cooling fluids from an internal cavity in the turbine blade. In one embodiment, the aperture is formed in the turbine blade during the manufacturing process as a result of one or more support projections used to position a core block in a turbine blade mold.

19 Claims, 3 Drawing Sheets

TURBINE BLADE CLOSURE SYSTEM

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates in general to sealing systems and, more particularly, to sealing systems for sealing internal cavities of hollow-cast turbine blades.

BACKGROUND OF THE INVENTION

Turbines are used in a variety of applications, such as aircraft engines, rocket engines, and other applications. Many of these applications expose the rotating turbine blades and stationary vanes (hereinafter referred to collectively as blades) of the turbine to extreme heat or cause the turbine blades to become extremely hot. This heat is dissipated using a cooling system that delivers cooling fluids to the turbine blades through complex interior cavity systems in the turbine blades. The cooling fluids enter the turbine blades through the end of the turbine blade coupled to the turbine housing and escapes through cooling holes in the blades (not shown).

Turbine blades are typically manufactured using a casting process. The complex interior cavity systems that form part of the cooling system are formed using core blocks. The core blocks have support projections that form apertures after the casting process. Often, these support projections are affixed to the mold at the end of the mold that forms the closed end of the turbine blade, which is also commonly referred to as the tip shelf of the turbine blade. Thus, once a turbine blade has been cast, and the mold and core block have been removed, the resulting turbine blade contains holes, or apertures, where the support projections where located during formation of the turbine blade. It is necessary to plug these holes formed by the support projections for the turbine blade to operate safely and for the turbine blades to realize the maximum cooling efficiencies offered by the cooling system. Otherwise, the cooling system cannot operate as designed, which may result in catastrophic damage to the turbine blades and other turbine components upon failure of the turbine blade.

Sealing these holes made in the turbine blades during the manufacturing process has been addressed in many ways in the past. For instance, the holes were closed using, for instance, brazing and fusion welding processes. However, high temperature superalloys, which are commonly used to form turbine blades, can be difficult to weld. In addition, brazing superalloys typically requires additional preparation and tighter fit up to produce a quality joint. More importantly, brazing often results in inferior joints due to defects and the brittle nature of the bond. Fusion welding often results in cracking of the weld metal and base metal affected by the weld. Thus, the use of brazing or fusion welding has not always produced reliable results.

In another example, the diameter of the support projections are reduced to very small bores. However, this solution increases the complexity of the manufacturing process by restricting the allowable tolerances and, therefore, increasing the cost of producing turbine blades.

Yet another solution for closing holes in the tip shelf of a turbine blade is described in U.S. Pat. No. 6,193,468 to Beeck et al. and shown in FIG. 1. Beeck discloses sealing an aperture in a tip shelf by inserting a closure member into another aperture that orthogonally intersects the aperture in the tip shelf. The method disclosed in Beeck requires that another hole be drilled in the turbine blade, which can further weaken the turbine blade and interfere with the structural integrity of the turbine blade.

Thus, a need exists for a simplistic and reliable system for sealing apertures formed in the outer wall of turbine blade bodies during manufacture of turbine blades.

SUMMARY OF THE INVENTION

Set forth below is a brief summary of the invention that solves the foregoing problems and provides benefits and advantages in accordance with the purposes of the present invention as embodied and broadly described herein. This invention is directed to a turbine blade closure system for sealing holes located in the outer wall of a turbine blade system. Typically, a turbine blade body is formed from an outer wall having an outer surface and an inner surface. The turbine blade also includes an internal cavity defined by the inner surface of the outer wall. The internal cavity receives cooling fluids from a turbine housing for reducing the temperature of the turbine blade to prevent catastrophic failure of the turbine blade. The turbine blade further includes at least one aperture in the outer wall of the turbine blade extending from the outer surface to the inner surface that is formed by a support projection used to position a core block in a mold.

This invention includes a closure member for sealing the aperture using friction welding. In one example, the closure member is generally circular and has an outside diameter that is larger than the largest cross-sectional dimension of the aperture. Thus, the closure member does not freely slide into the aperture. Rather, the closure member seals the aperture after undergoing a friction welding process.

Friction welding is a solid state joining process and includes numerous methods, such as, but not limited to, a continuous method, referred to as direct drive welding, and an inertia method, referred to as flywheel welding. Direct drive friction welding includes rotating a closure member at a high rate of speed and contacting the rotating closure member with the surface of the turbine blade proximate to an aperture. A load is applied to the closure member while the closure member is rotating to increase the amount of friction heat generated. The closure member is rotated until the closure member plasticizes, or softens, at which time rotation of the closure member is stopped. The closure member is then immediately advanced into the aperture, at which time the weld is compete. Any portion of the closure member that extends outside of the turbine blade may be removed to provide a finished surface to the turbine blade.

The flywheel welding process includes rotating a flywheel at a predetermined rate of speed with a closure member coupled to the flywheel. Once a predetermined rotational speed has been achieved, the source of rotational motion driving the flywheel is removed, and the flywheel rotates freely. While the flywheel is spinning, the closure member is placed in contact with a surface surrounding an aperture. A significant amount of frictional heat is developed sufficient to soften or plasticize the closure member. The contact between the closure member and the turbine blade causes the flywheel to stop rotating after the bond forms.

The closure member may have a flat, a bevel, or both, on one end for increasing the bond surface area and reducing the necessary amount of axial load needed to produce a sufficient amount of friction to join the closure member together with the turbine blade. In addition, the turbine blade body may include one or more bevels opening into the aperture. The angles of the bevels may or may not correspond with each other. The depth of insertion of the closure member relative to the main body of the turbine blade may vary from a very shallow depth to the entire depth of the tip shelf.

Objects of this invention include, but are not limited to:

reliably sealing apertures formed in turbine blades by positioning support projections during the manufacturing process in a cost efficient manner; and sealing an aperture in the body of a turbine blade without cracking the turbine body, and more specifically, without cracking the tip shelf.

An advantage of this invention is that using friction welding to seal an aperture in a turbine blade requires relatively few steps to complete, and therefore, allows the realization of manufacturing efficiencies of this system.

Another advantage of this invention is that the closure member does not cause the tip shelf to crack when placed under a load from the closure member.

Yet another advantage of this invention is that either the closure member or the turbine body, or both, of this invention include flat surfaces, bevels, or combinations thereof, which reduce the axial load or increase the bond area necessary to produce a satisfactory weld joint.

Still yet another advantage of this invention is that friction welding is a solid state welding process that produces relatively defect free weld joints because the base metal is typically not melted during the process.

DETAILED DESCRIPTION OF THE INVENTION

Figure 1:
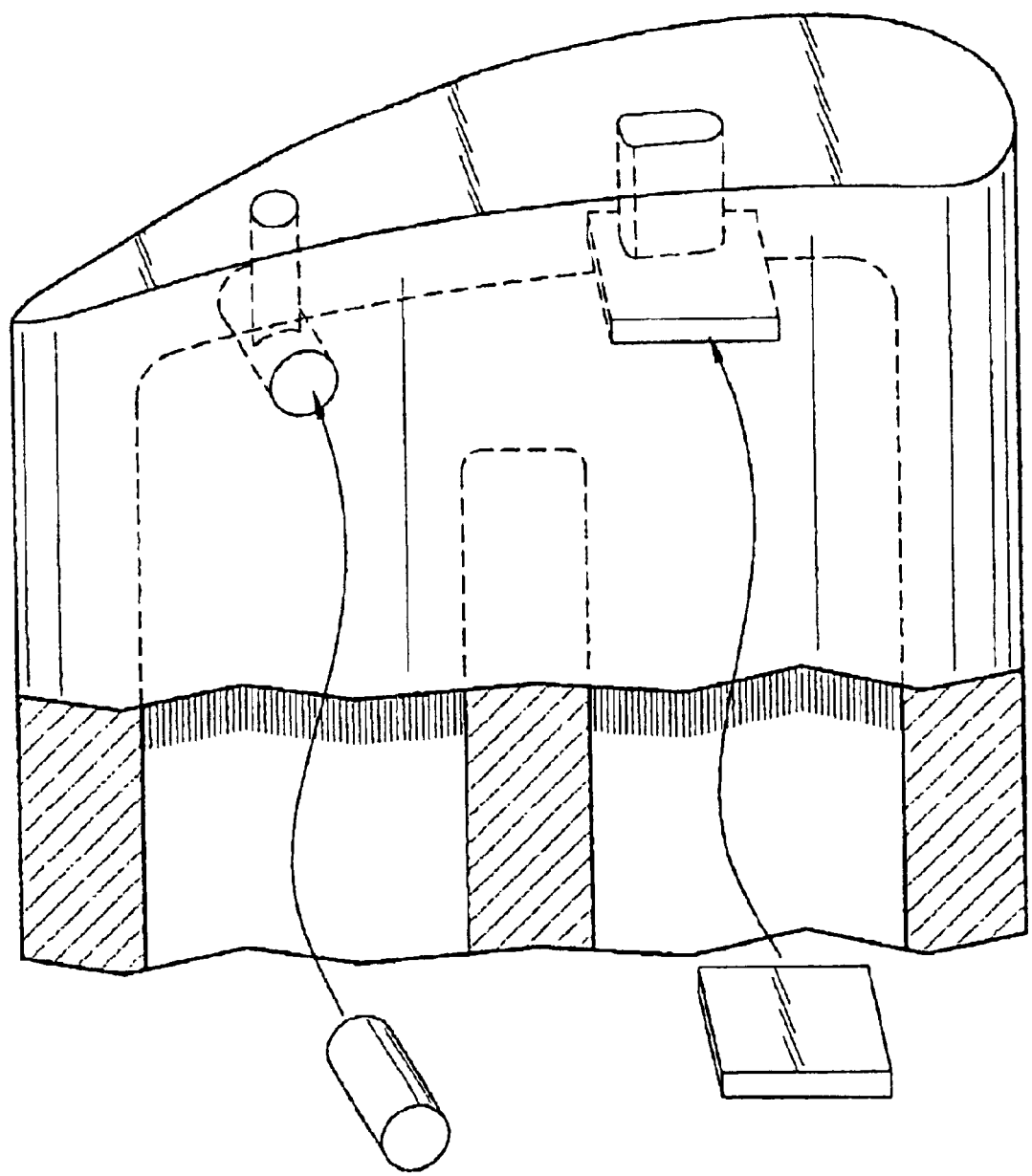
FIG. 1 is a perspective view of a prior art sealing system for turbine blades.
Figure 2:
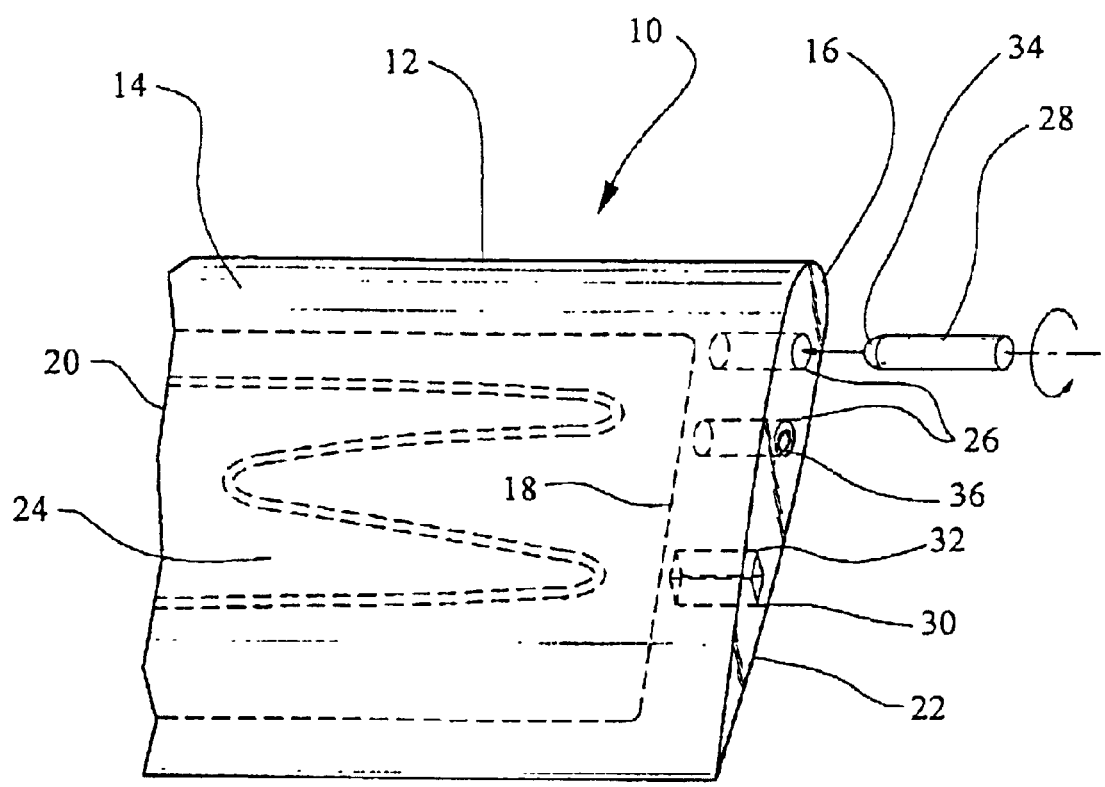
FIG. 2 is a perspective view of a turbine blade having a plurality of apertures located in a tip shelf of the turbine blade and showing a closure element.

The turbine blade closure system 10 of the present invention provides a mechanism for sealing hollow internal cavities of hollow-cast turbine blades; and more particularly, for sealing apertures extending from the hollow internal cavities, also referred to as a core, to exterior surfaces of hollow-cast turbine blades. Typically, a turbine blade, usable in industrial gas turbines, jet engines, rocket engines, and the like, and as shown in FIG. 2, includes a body 12 formed from an outer wall 14 having an outer surface 16 and an inner surface 18. The turbine blade, whose exterior shape may vary based on its intended application, also includes a hollow internal cavity defined by the inner surface 18 of the outer wall 14. The turbine blade further includes an open end 20, which is usually positioned proximate to the axis of rotation of the turbine, and a closed end 22, commonly referred to as a tip shelf, positioned generally opposite to the open end 20. The open end 20 is configured to be attached to a center housing of a turbine and is often times configured to allow a cooling fluid to flow through interior portions of the blade to cool the blade and remove excess heat developed during operation.

Typically, turbine blades are formed using a casting process and, as previously mentioned, include at least one cavity 24 positioned in interior aspects of the blade. The cavity 24 is formed by positioning a core block within a turbine blade mold. The core block is held in position at the open end 20 and at other locations, such as through the closed end 22, otherwise referred to as the tip shelf, of the turbine blade using a plurality of support projections. Typically, the support projections have a small diameter, which may, for example, be within the range of about 1/16 of an inch to about 1/2 of an inch in diameter and about 2 inches long. The support projections accurately position the core block within the mold so that the thickness of the outer wall 14 and the location and thickness and alignment of the internal cavities of the turbine blade may be accurately controlled during the manufacturing process.

Once the mold and core block have been properly positioned, the turbine blade is produced by pouring a molten metal into the mold. After the material solidifies, the turbine blade is removed from the mold, and the core block is removed from the turbine blade leaving an internal cavity 24 and aperture 26. The blade produced using this process has at least one and often multiple apertures 26 in the tip shelf 22 of the turbine blade. The apertures 26 each have a longitudinal axis that may or may not be aligned generally parallel to a longitudinal axis of the turbine blade.

In many applications, turbine blades are subject to extreme heat from the environment in which the turbine blades are used. Typically, the turbine blades are cooled by passing a cooling fluid, such as, but not limited to air, through the internal cavity 24 of the turbine blades. Preferably, the apertures 26 in the tip shelf 22 of the turbine blades are sealed in order to prevent loss of cooling fluid through the apertures 26 and to increase the efficiency of the turbine blades.

According to the turbine blade closure system 10 of this invention, as shown in FIG. 2, each aperture 26 in the turbine blade is closed with a closure element 28 that is coupled to each aperture using friction welding. In one example, the closure element 28 is generally cylindrical with a circular cross-section. While closure elements 28 having other shaped cross-sections may be used, a generally circular cross-section is preferred. The closure element 28 may be used in a variety of lengths, such as, but not limited to about 2 inches. The closure element 28 may be formed from various materials, such as, but not limited to, superalloys formed from iron based materials, nickel based materials, or cobalt based materials. These materials may be polycrystalline, directionally solidified, single crystal, or a powder metallurgical product. Examples of these materials include, but are not limited to, CM247 alloy, IN738 alloy, PWA1483 alloy, IN939 alloy, and ECY768 alloy.

Figure 4:
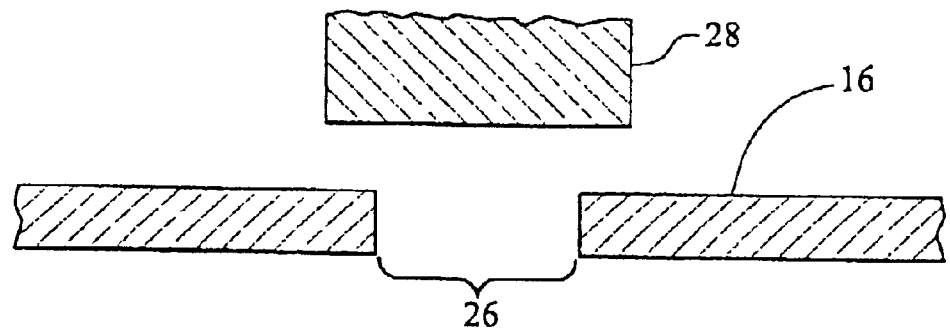
FIG. 4 is a cross-sectional view of a closure member having a flat edge and an aperture having a flat edge.

The closure element 28 also preferably has an outer diameter that is larger than the largest dimension of the aperture 26, as shown in detail in FIG. 4. For instance, if the aperture 26 has a generally circular cross-section, the outer diameter of the closure element 28 is greater than the largest dimension of the aperture 26 is the diameter. Alternatively, if the cross-section of the aperture 26 is rectangular, or otherwise polygonal, the outer diameter of the closure element 28 is greater than the distance from a first corner 30 of the rectangle to a second corner 32 located diagonally across the rectangle from the first corner 30. Such a configuration insures that frictional heating occurs while rotating the closure element 28 and forcing an end of the closure element 28 against the surface of the turbine blade surrounding the aperture 26.

The outer diameter of the closure element 28 may vary between numerous sizes, and in one embodiment, may be within the range, but is not limited to being, between about ¼ of an inch and about ½ of an inch. The outer diameter of the closure element 28, or the largest diameter of the closure element 28 if the closure element has a non-circular cross-section, is at least 0.04 inches larger than the largest dimension of the aperture 26 and is preferably less than about 0.25 inches larger than the largest diameter of the aperture 26.

Figure 3:
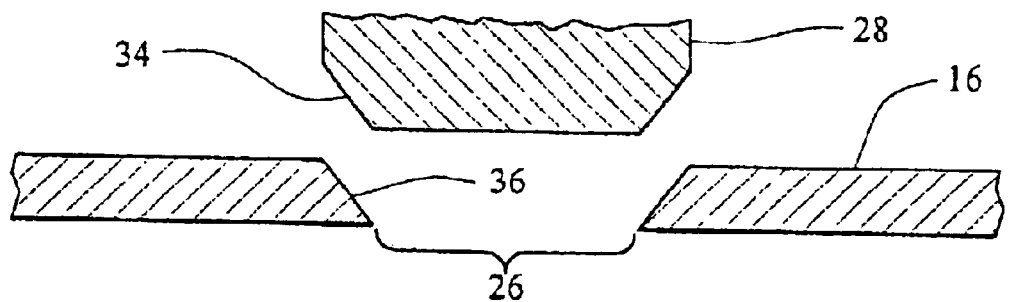
FIG. 3 is a cross-sectional view of a closure member having a beveled edge and an aperture having a beveled edge.
Figure 5:
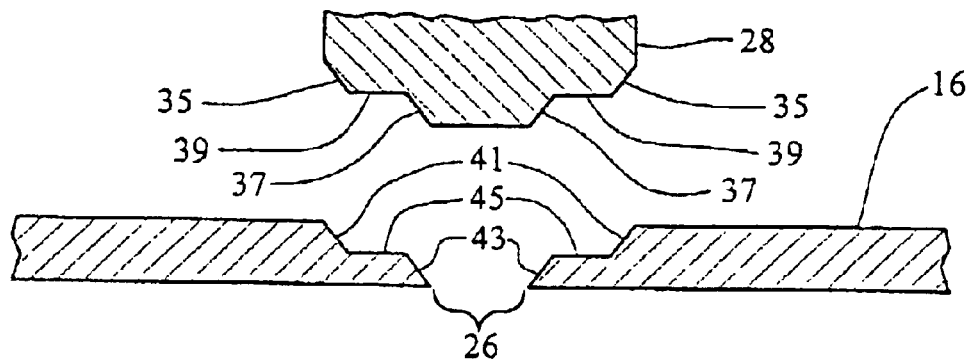
FIG. 5 is a cross-sectional view of a closure member with a single edge having two bevels and a flat surface and an aperture having two bevels and a flat surface.

The closure element 28 may also include a beveled edge 34 at one end, as shown in FIG. 2 and in more detail in FIG. 3. The beveled edge 34 may range between any angle greater than about 0 degrees and about 60 degrees. In one embodiment, the beveled edge 34 may range between about 30 degrees and about 45 degrees. The closure element 28 may also have a flat surface, as shown in detail in FIG. 4. Further, the closure element 28 may include two bevels 35 and 37, as shown in detail in FIG. 5, which are separated by a flat surface 39. An aperture 26 in a turbine blade may or may not have a corresponding shape having a plurality of bevels 41 and 43 separated by a flat surface 45 for receiving the closure element 28, as shown in FIGS. 3-5.

The aperture 26 typically includes a generally circular cross-section. However, the aperture 26 may have non-circular shaped cross-sections, such as, but not limited to, rectangular, elliptical, and polygonal. Regardless of the shape of the cross-section, the outside diameter of the closure element 26 should be larger than the largest dimension of the aperture 26, as previously described.

The body 12 of the turbine blade may also include a bevel opening 36 into the aperture 26, and more specifically, may include one or more bevels, or one or more flat surfaces, or any combination thereof, positioned proximate to the outer surface 16. The beveled edge 36 may range between any angle greater than about 0 degrees and less than or equal to about 60 degrees. In one embodiment, the beveled edge 36 may range between about 30 degrees and about 45 degrees. The angle of the bevel opening 36 into the aperture 26 may or may not correspond to the angle of the bevel 34 of the closure element 28. Alternatively, the body of the turbine blade may have other shaped transitions proximate to aperture 26.

Turbine blades may be constructed from a variety of materials based on their intended application, such as, but not limited to superalloys. If the turbine blade is constructed of IN738, the thickness of the tip shelf 22 of the turbine blade proximate to the aperture should be at least about ⅛ of an inch. Tip shelf thicknesses less than ⅛ of an inch for this material often cannot support the axial forces used during the friction welding process and results in material failure, such as collapse of the tip shelf 22. Including a beveled edge on the closure element 28 reduces the axial load necessary to complete the friction weld to an amount that is beneath the threshold at which the tip shelf collapses. Therefore, the closure element is capable of being friction welded to the turbine blade without the tip shelf cracking.

The closure element 28 is sealed to a turbine blade using friction welding. As is evident to those skilled in the art, friction welding includes numerous different methods. In one embodiment, the closure element 28 is secured to an aperture 26 using an inertia friction welding process. In this method, a closure element 28 is coupled to an aperture 26 using a flywheel method. This method involves rotating a flywheel having a closure element 28 secured to it. The closure element 28 may be rotated at a speed within the range between about 3,000 revolutions per minute (rpm) and about 5,000 rpm, and more preferably, about 3,500 rpm. Once the flywheel has reached a predetermined speed, the drive source is removed from the flywheel, and the flywheel rotates freely. The closure element 28 is then advanced and contacts a surface of a turbine blade surrounding an aperture 26. A force is applied along the longitudinal axis of the closure element 28 to cause the development of frictional heat at the interface where a surface of the turbine blade contacts the closure element 28. In one embodiment, the amount of force applied may vary between about 2,600 pounds and about 5,200 pounds. Closure elements 28 having beveled edges 34 require a smaller axial load to insert the closure element 28 into an aperture 26 than a closure element 28 lacking a beveled edge 34.

The inertial energy of the rotating flywheel is transferred into frictional heat developed from the friction created between the rotating closure member 28 and the surface 16 of the turbine blade. This friction causes the flywheel to eventually stop rotating. However, before the flywheel stops, the closure member reaches a temperature at which the closure member plasticizes and forms a bond with the turbine blade.

In another method of friction welding, referred to as a direct drive method, the closure element 28 is secured to an aperture 26 by first rotating the closure element 28 at high speeds while the turbine blade remains stationary, or vice versa. While the closure element 28 is rotating, the closure element 28 is placed in contact with the aperture 26 and the outer surface 16 of the turbine blade. This configuration is maintained until the closure element 28 begins to plasticize, or soften. At the point that the closure element 28 begins to plasticize, the closure element 28 is stopped from rotating, and the closure element 28 is advanced into the aperture 26 to form the weld. Any portion of the closure element 28 not contained in the turbine blade is removed using any conventional process, such as, but not limited to, cutting or grinding, or both, to provide a finished surface to the surface of the turbine blade.

The foregoing is provided for purposes of illustrating, explaining, and describing embodiments of this invention. Modifications and adaptations to these embodiments will be apparent to those skilled in the art and may be made without departing from the scope or spirit of this invention or the following claims. For example, the method of friction welding can vary within the scope of the invention and include direct drive and fly wheel techniques and may include other friction welding techniques.

What is claimed is:

1. A hollow-cast turbine blade, comprising:
   a turbine blade body formed by an outer wall comprising an outer surface and an inner surface, said body including an internal cavity defined by the inner surface of the outer wall;
   the outer wall of the body defining at least one aperture extending from the outer surface to the inner surface;
   at least one closure element positioned in the at least one aperture and joined to the body using friction welding;
   wherein the body and a portion of the closure element in contact with the body form a weld at the interface between the at least one closure element and the inner surface forming the outer wall of the body; and wherein the at least one closure element has a cross-sectional area greater than a cross-sectional area of the at least one aperture.

2. The hollow-cast turbine blade of claim 1, wherein the at least one aperture is positioned in a tip shelf of the hollow cast turbine blade.

3. The hollow-cast turbine blade of claim 1, wherein the at least one aperture is positioned in a tip shelf of the hollow cast turbine vane.

4. The hollow-cast turbine blade of claim 1, wherein the at least one closure element is comprised of a material selected from the group consisting of iron based materials, nickel based materials, and cobalt based materials.

5. The hollow-cast turbine blade of claim 1, wherein the at least one blade is comprised of a material selected from the group consisting of iron based materials, nickel based materials and cobalt based materials.

6. The hollow-cast turbine blade of claim 1, wherein the outer surface defines a bevel opening to the at least one aperture.

7. The hollow-cast turbine blade of claim 6 wherein the bevel varies between about 30 degrees and about 45 degrees.

8. The hollow-cast turbine blade of claim 1, wherein the at least one aperture has a circular cross-section along at least a portion of its length.

9. The hollow-cast turbine blade of claim 1, wherein the at least one aperture has a non-circular cross-section along at least a portion of its length.

10. The hollow-cast turbine blade of claim 1, wherein the at least one closure element further comprises at least one beveled end.

11. The hollow-cast turbine blade of claim 10, wherein the at least one beveled end comprises a bevel that varies between about 30 degrees and about 45 degrees.

12. The hollow-cast turbine blade of claim 10, wherein the at least one closure element further comprises at least two bevels, wherein the at least two bevels are separated by a flat surface.

13. A method of sealing an aperture in a hollow-cast turbine blade, comprising:

rotating a closure element;

contacting the rotating closure element with the aperture in a tip shelf of the hollow-cast turbine blade;

applying a force to the rotating closure element in a direction generally parallel to a longitudinal axis of the rotating closure clement to generate heat from friction developed between the rotating closure element and the hollow-cast turbine blade; and advancing the closure element into the aperture.

14. The method of claim 13, further comprising the step of stopping the closure element from rotating after the closure element has begun to plasticize, which is performed before the step of advancing the closure element into the aperture.

15. The method of claim 13, wherein the step of rotating the closure element comprises rotating the closure element at a speed between about 3,000 revolutions per minute and about 5,000 revolutions per minute.

16. The method of claim 13, wherein applying a force comprises applying a force within the range between about 2,600 pounds and about 5,200 pounds.

17. The method of claim 13, further comprising cutting the closure element proximate to the hollow-cast turbine blade to produce a finished surface.

18. A hollow-cast turbine blade, comprising:

a turbine blade body formed by an outer wall comprising an outer surface, an inner surface and a tip shelf, said body including in internal cavity defined by the inner surface of the outer wall;

the outer wall of the body defining at least one aperture extending from the tip shelf to the inner surface; and at least one closure clement having a generally circular cross-section positioned in the at least one aperture and coupled to the body using friction welding, whereby the internal cavity is sealed to prevent a cooling fluid located in the internal cavity from escaping through the at least one aperture;

wherein the body and a portion of the closure element in contact with the body form a weld at the interface between the at least one closure element and the inner surface forming the outer wall of the body; and wherein the at least one closure element has a cross-sectional area greater than a cross-sectional area of the at least one aperture.

19. The hollow-cast turbine blade of claim 18, wherein the at least one aperture is generally parallel to a longitudinal axis of the turbine blade.

* * * * *